(12) United States Patent
Manzoor

(10) Patent No.: US 10,883,563 B2
(45) Date of Patent: Jan. 5, 2021

(54) TORSIONAL VIBRATION DAMPER WITH DISCRETIZED HUB

(71) Applicant: Suhale Manzoor, Plymouth, MI (US)

(72) Inventor: Suhale Manzoor, Plymouth, MI (US)

(73) Assignee: OPTIMIZED SOLUTIONS, LLC, Plymouth, MI (US)

( * ) Notice: Subject to any disclaimer, the term of this patent is extended or adjusted under 35 U.S.C. 154(b) by 52 days.

(21) Appl. No.: 16/166,244

(22) Filed: Oct. 22, 2018

(65) Prior Publication Data

US 2019/0128370 A1    May 2, 2019

Related U.S. Application Data

(60) Provisional application No. 62/578,052, filed on Oct. 27, 2017.

(51) Int. Cl.
*F16F 15/14* (2006.01)
*F16F 15/136* (2006.01)

(52) U.S. Cl.
CPC ........ *F16F 15/1442* (2013.01); *F16F 15/136* (2013.01); *F16F 2224/0208* (2013.01); *F16F 2230/00* (2013.01)

(58) Field of Classification Search
CPC .... F16F 15/126; F16F 15/1245; F16F 15/124; F16F 15/1442; F16F 15/1435; F16F 15/1492; F16F 15/136; F16F 15/1457; F16F 15/08; F16F 15/1203; F16F 15/3153; F16F 15/315; F16F 15/167; F16F 15/13164; F16F 15/1207; F16F 15/30; F16F 2224/025; F16F 2226/045; F16H 2055/366; Y10T 74/2131; Y10T 74/2132

USPC ............... 301/59, 69, 81, 75, 74, 80, 67, 68
See application file for complete search history.

(56) References Cited

U.S. PATENT DOCUMENTS

| | | | | |
|---|---|---|---|---|
| 15,297 A | * | 7/1856 | Latta | B60B 1/12 301/67 |
| 286,746 A | * | 10/1883 | Notley | 137/247.11 |
| 396,461 A | * | 1/1889 | Bolick | B60B 1/00 301/70 |
| 403,908 A | * | 5/1889 | Bolick | B60B 1/12 301/67 |
| 426,730 A | * | 4/1890 | Mayo | B60B 1/00 301/68 |

(Continued)

FOREIGN PATENT DOCUMENTS

| | | | | |
|---|---|---|---|---|
| DE | 102006046681 A1 | * | 4/2008 | .......... F16F 15/1215 |
| WO | WO-9802674 A2 | * | 1/1998 | ............ F16F 15/167 |
| WO | WO-0058643 A1 | * | 10/2000 | ........ F16F 15/12306 |

*Primary Examiner* — Daniel D Yabut

(57) ABSTRACT

The disclosed invention is a novel method for constructing a Torsional Vibration Damper (TVD). The traditional means used to construct the hub of the TVD was to employ a single material. The disclosed invention essentially discretizes the construction of the TVD hub into three regions: nose, spokes, and flange, and simultaneously aligns unique materials and manufacturing methods for each region with the structural loads borne thereby. Consequently, the invention helps in reduces four unwanted characteristics: (1) mass; (2) polar mass moment of inertia; and (3) casting scrap; and (4) cost. Furthermore, because of this construction other enhancements to the axial and angular structural integrity of the TVD can be reaped in certain cases.

5 Claims, 4 Drawing Sheets

(56) References Cited

U.S. PATENT DOCUMENTS

| | | | | |
|---|---|---|---|---|
| 1,004,988 A | * | 10/1911 | Callan | B60B 9/20 |
| | | | | 152/63 |
| 1,181,049 A | * | 4/1916 | Wiesenacker et al. | |
| | | | | B60B 23/04 |
| | | | | 301/16 |
| 1,507,083 A | * | 9/1924 | Morgan | B60B 1/12 |
| | | | | 301/67 |
| 1,507,615 A | * | 9/1924 | Mosier | B60B 1/00 |
| | | | | 301/69 |
| 3,062,072 A | * | 11/1962 | Hirst | B60K 17/22 |
| | | | | 74/574.4 |
| 5,573,461 A | * | 11/1996 | Colford | F16D 3/62 |
| | | | | 464/83 |
| 6,062,103 A | * | 5/2000 | Soares | F16F 15/13142 |
| | | | | 192/214 |
| 6,299,541 B1 | * | 10/2001 | Bertin | F16F 15/13164 |
| | | | | 192/214 |
| 7,500,416 B2 | * | 3/2009 | Fenioux | F16F 15/1315 |
| | | | | 74/573.12 |
| 2019/0047690 A1 | * | 2/2019 | Bottasso | F16F 15/1457 |

* cited by examiner

TORSIONAL VIBRATION DAMPER WITH DISCRETIZED HUB

FIELD OF INVENTION

The present invention generally relates to a device for attenuating torsional vibrations inherent to certain rotating shafts. More particularly the invention discloses a novel method for constructing a Torsional Vibration Damper.

BACKGROUND

Vibrating shafts have torsional vibrations inherent due to their non-uniform construction (e.g. crankshafts, and camshafts), or the nature of the driving mechanism employed (e.g. firing order of an internal combustion engine, or gearing), or the method employed for their connection to another shaft (e.g. through a universal, or a constant-velocity joint). These torsional vibrations if left unattended reach a peak amplitude when their exciting frequency approaches the natural torsional frequency of the shaft; this phenomenon is called resonance, and can cause premature fatigue failure of the shaft, or can be felt as undesirable noise or vibration by a vehicle or machine operator.

Torsional Vibration Dampers (TVDs) are commonly employed to attenuate such undesirable vibrations. The objective of a TVD is break the vibratory amplitude peak at resonance to two (or more) smaller peaks which have sufficiently reduced amplitudes that can be sustained by the shaft.

In recent years, engine and vehicle manufactures have been greatly focusing on reducing the mass and polar mass moment of inertia (PMMI) of rotating components in the crank-train. It must be appreciated that some components of the rotating crank-train necessitate a certain mass and PMMI, examples being the TVD ring, the crankshaft counterweights, and the engine flywheel. Such mass and PMMI work to improve crank-train performance and are classified as being "symbiotic." However, the mass and PMMI of some components are counterproductive and worsen the performance of the crank-train. Such mass and PMMI are classified as being "parasitic," and their reduction is desired to improve the Noise Vibration and Harshness (NVH) performance, increase fuel economy, improve exhaust emissions, and enhance the overall durability of the engine. The TVD hub is one such component with parasitic mass and PMMI.

FIG. 1 illustrates a simple conventional TVD that includes an inner rigid structural bracket namely the hub 1; an outer active inertial component namely the ring 3; and an elastomer 2 (in ring or strip form) that is press-fitted between hub 1 and ring 3. Hub 1 connects the TVD to the vibrating shaft via the central cylindrical surface namely the bore 113. Furthermore, hub 1 includes an outer peripheral axis-symmetric surface 132 that receives the inner-diametric surface of elastomer 2. Ring 3 similarly includes an inner peripheral axis-symmetric surface 31 that receives the outer-diametric surface of elastomer 2.

Hub 1 is usually cast from a single material including but not limited to Gray Iron, or Nodular Iron. The invention disclosed herein recognizes that hub 1 may be discretized by virtue of its geometric configuration into three distinct regions namely (1) nose 11 including a first planar annular surface namely the washer face 111, opposed by a second planar annular surface namely the back face 112 and bounded by a radially proximate cylindrical surface namely bore 113, and a radially distal axis-symmetric surface namely seal 114; (2) spokes 12 including a plurality of radial extensions connecting the distal radial periphery of nose 11 to the proximate radial periphery of the flange 13; and (3) flange 13 including a first planar annular surface 133, opposed by a second planar annular surface 134 and bounded by a radially proximate axis-symmetric surface 131, and a radially distal axis-symmetric surface 132.

Gray Iron, or Nodular Iron have traditionally been preferred over low carbon steel for constructing hub 1 because of their cost effectiveness, ability to be cast, machinability, and excellent hardness (required for resisting seal wear). For example, Brinell hardness of SAE J431 grade 3500 Gray Iron is 230 (generally adequate for resisting seal wear), while that of AISI 1020 cold rolled steel is only 121 (generally inadequate for resisting seal wear).

In rare instances, Die Cast, Squeeze Cast, or Forged Aluminum have been utilized for constructing hub 1, but with a protective hardened Chrome Molybdenum Steel sleeve press-fitted over seal 114 to provide the necessary hardness for resisting seal wear. This manufacturing process has proven to be cost-prohibitive hence has been very sparingly used in production.

The traditional process of casting the hub involves pouring molten Gray Iron or Nodular Iron via a sprue in the flange region into the mold cavity and "feeding" the casting such that the Iron first forms flange 13, then flows through the spokes 12 into nose 11. This process forces the spokes 12 to have a certain cross-sectional geometry to ensure proper filling of the mold cavity. If spokes 12 don't have sufficient cross-sectional the molten metal tends to cool and solidify prematurely and blocking off the flow into the nose 11 thereby producing defective parts. To compound this problem, there is no porosity allowed on the nose 1 as it provides a barrier preventing the engine oil from leaking out of the engine block.

This fact effectively forces spokes 12 to be larger than what is necessitated by the structural and NVH loading in the application. Furthermore, flange 13 that contributes to most of the mass and PMMI of hub 1 is the region that is structurally loaded very lightly in the application.

SUMMARY OF INVENTION

The disclosed invention geometrically trisects the standard TVD hub and couples the structural demand of each resulting region with a corresponding material, and a practical method for manufacturing the same. These three regions are the nose, spokes, and flange as defined above. The resulting device enables dramatic reduction of the mass and PMMI of the hub, while not compromising its structural integrity, NVH performance, and cost-effectiveness.

More particularly, the nose is constructed from a hard material such as Gray Iron or Nodular Iron to ensure the adequate wear characteristics required; the spokes are constructed from a strong ductile material such as Low Carbon Steel to ensure adequate bending and torsional fatigue strength; and the flange is constructed from a light weight material such as Aluminum as it is a lightly loaded structural member in the application.

This invention and the method of assembly thereof may be further appreciated considering the following detailed description and drawings in which:

DETAILED DESCRIPTION

The disclosed invention geometrically trisects the standard TVD hub and couples the structural demand of each resulting region with a corresponding material, and a practical method for manufacturing the same. The resulting device enables dramatic reduction of the mass and PMMI of the hub, while not compromising its structural integrity, NVH performance, and cost-effectiveness.

Figure 1:
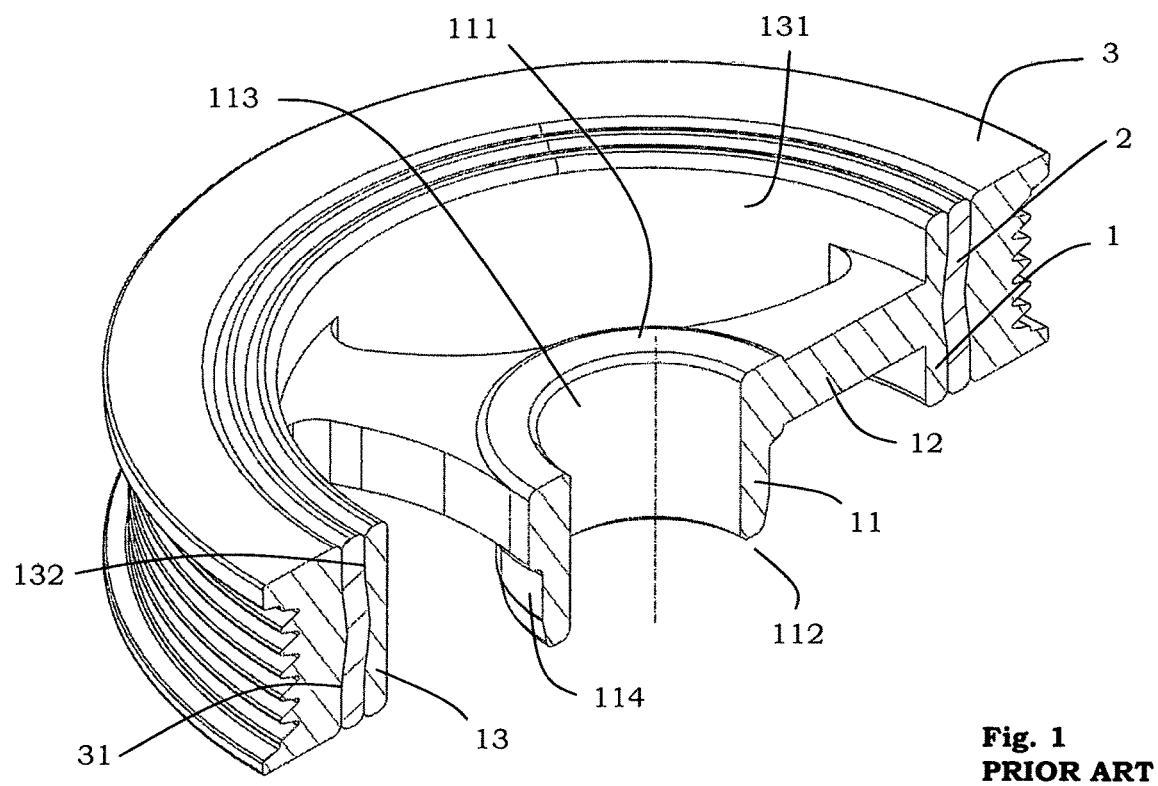
FIG. 1 is a partial cross-section illustrating the structure of a conventional TVD.
Figure 2:
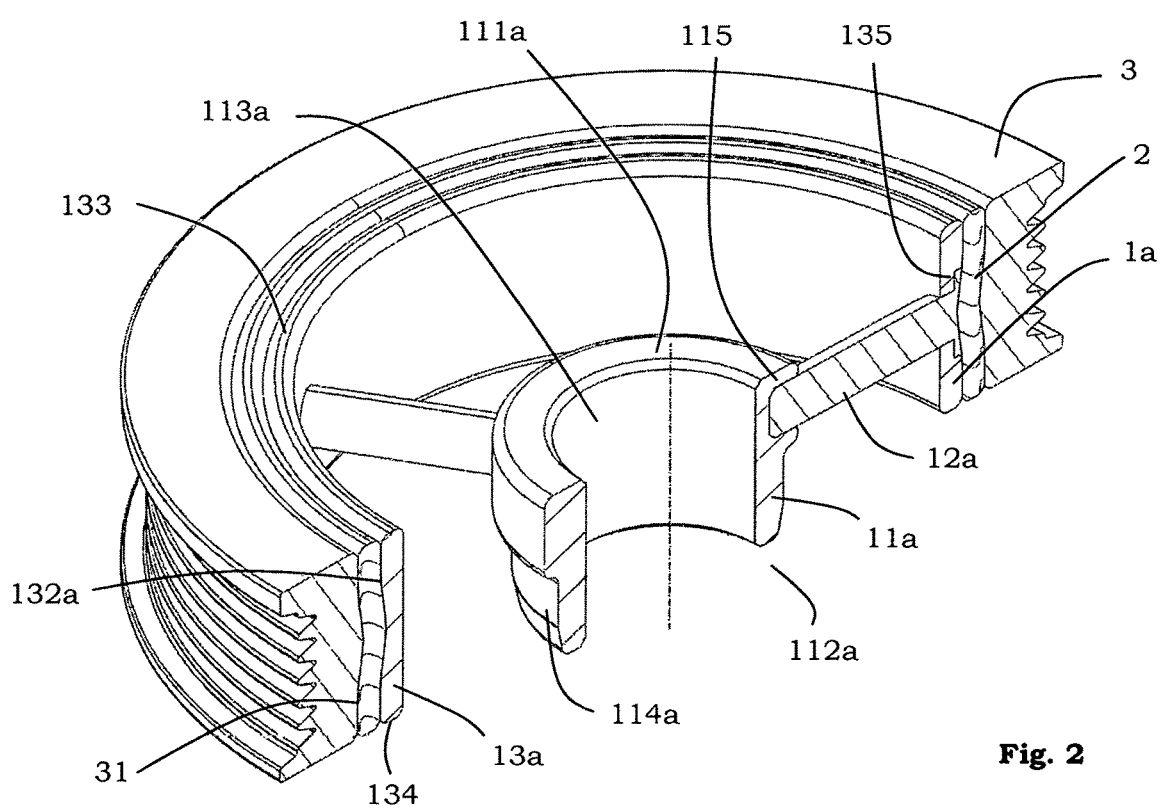
FIG. 2 is a partial cross-section illustrating an embodiment of the invention where the ring is positioned radially outward from the hub.

FIG. 2 illustrates an embodiment of the invention that comprises of hub 1a, ring 3, and elastomer 2. Here the ring 3 and elastomer 2 have not changed from those represented in FIG. 1, and therefore need not be discussed except with reference to their geometric positioning with respect to hub 1a. In this embodiment, elastomer 2 and ring 3 are positioned radially outward from the hub 1a.

Hub 1a includes three regions that are constructed using separate materials and manufacturing processes. At the radially proximate location to the TVD center-line is nose 11a including a first planar annular surface namely washer face 111a, opposed by a second planar annular surface namely back face 112a and bounded by a radially proximate cylindrical surface namely bore 113a, and a radially distal axis-symmetric surface namely seal 114a. Nose 11a also includes a plurality of holes 115 that may or may not be threaded (depending upon the type of fasteners used) acting as receivers for spokes 12a.

Extending radially outward from nose 11a are a plurality of spokes 12a connecting the distal radial periphery of nose 11a to the proximate radial periphery of the flange 13a, including but not limited to threaded bolts, partially threaded bolts, shoulder bolts, stepped or straight pins, hollow pins, spring pins, rivets, stakes etc. Spokes 12a may have a tensile preload on them (if they are threaded bolts, or shoulder bolts); a compressive preload on them (if they are partially threaded bolts—thread being proximate to the head of the bolt); or no preload (if they are press-fitted solid or hollow pins).

At the radially distal location to the TVD centerline, is the flange 13a including a first annular planar surface 133a, opposed by a second annular planar surface 134a and bounded by a radially proximate axis-symmetric surface 131a, and a radially distal axis-symmetric surface 132a. Flange 13a also includes a plurality of radially oriented counterbored or countersunk (CB/CS) holes 135 that receive spokes 12a. The through holed portions of CB/CS holes 135 may be threaded if partially threaded bolts are used—thread being proximate to the head of the bolt); or non-threaded if standard bolts, shoulder bolts, or pins are used for spokes 12a. It must be appreciated that the radially distal axis-symmetric surface 132a after machining includes two materials (of spokes 12a and of flange 13a).

There are several possible embodiments that have been contemplated using different fastener types for spokes 12a. Furthermore, alternate embodiments may be contemplated where the spokes 12a are not vertically oriented, but oriented at an angle to produce hub 1a where the nose 11a and the flange 13a are axially offset with respect to each other.

The nose 11a can be constructed from any rigid material that can bear the compressive load of the crankshaft bolt that is tightened against the washer face 111a, and has adequate wear resistance for the front engine seal (at seal 114a). Most commonly this would be either Gray Iron or Nodular Iron. However, the manufacturing method may now incorporate billet machining (machining from bar stock) as a cost-effective alternative given the small size of this component. Billet machined Aluminum with a hardened Chrome Molybdenum Steel sleeve could also be used as an alternative material.

The spokes 12a usually experience a combination of reverse torsional and bending fatigue type loading in the application and must be constructed from a rigid strong material with some ductility. Such materials include but are not limited to Aluminums, Gray Irons, Nodular Irons, Steels, or even Composite materials such as Glass Reinforced Nylons. However, the most cost-effective option for the construction of spokes 12a is to use commercial grade Steel fasteners including but not limited to threaded bolts, partially threaded bolts, shoulder bolts, stepped or straight pins, hollow pins, spring pins, rivets, stakes etc.

The flange 13a is constructed from a relatively light but rigid material including but not limited to Aluminums, Gray Irons, Nodular Irons, Steels, or even Composite materials such as Glass Reinforced Nylons. Flange 13a is a lightly loaded structural component but is essential to support the elastomer 2 at a certain radial distance from the axial centerline of the TVD. Therefore, due to the nature of its geometric construction flange 13a the largest contributor to the parasitic mass and PMMI of hub 1a. Every effort must be made to make this component as light as possible without compromising its structural stability.

The resulting construction yields a dramatic reduction in mass and PMMI of the hub 1a when compared to its traditional counterpart hub 1 in FIG. 1. For example, the hub 1 in FIG. 1 when cast and machined completely out of Gray Iron (or Nodular Iron because it has the same density) has a mass of 0.483 kg and a PMMI of 769 kg-mm$^2$; while the hub 1a in FIG. 2 which has the same geometric configuration where the nose 11a is constructed from Gray Iron (or Nodular Iron because it has the same density), the spokes 12a are constructed from standard steel bolts, and the flange 13a is constructed from Aluminum has a mass of 0.256 kg and a PMMI of 314 kg-mm$^2$. This essentially shows a mass reduction of 47% and a PMMI reduction of 59% between a traditionally constructed hub and that disclosed by the invention. Though different configurations would yield different reductions, it can be safely assumed that mass reduction between 0% and 70% can be expected and PMMI reduction between 0% to 80% can be expected. Additionally, the invention will also yield reduction in casting scrap and cost.

Figure 3:
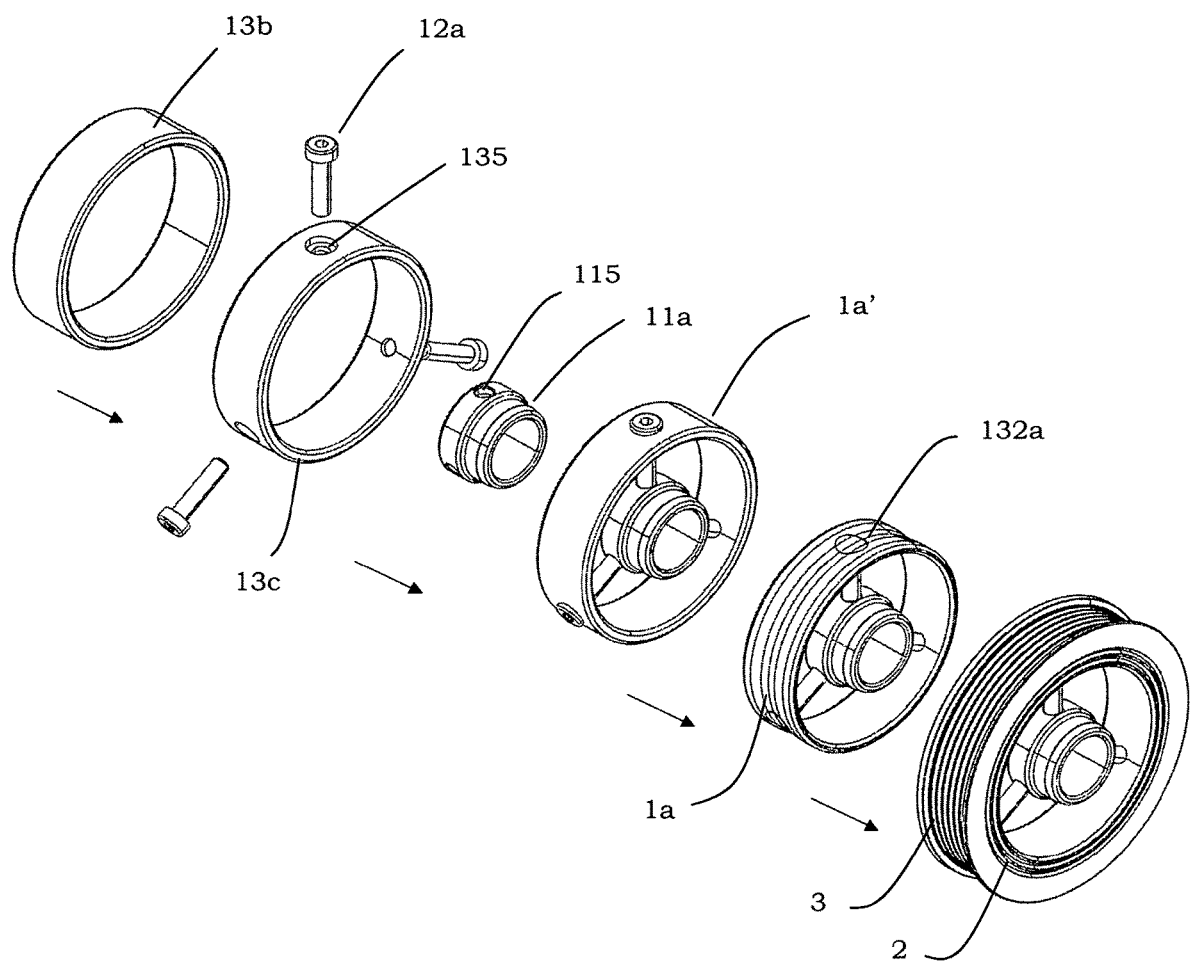
FIG. 3 is an illustration of the process of constructing the invention.

FIG. 3 illustrates a method for constructing the invention. The process of manufacturing a finished hub 1a essentially consists of four stages followed by final assembly. These stages are illustrated via arrows from the left-hand top to the right-hand bottom of FIG. 3.

In the first stage the hub 1a starts off with three components: (1) the raw flange 13b which has associated machining stock on its outer-diameter surface; (2) the spokes 12a that comprise of a plurality of desired headed fasteners; and (3) a fully machined nose 11a with threaded or unthreaded holes 115 for receiving spokes 12a.

In the second stage, a series of radially oriented CB/CS holes 135 are machined into flange 13c. The through holed portions of CB/CS holes 135 may be threaded if partially threaded bolts are used—thread being proximate to the head of the bolt; or non-threaded if standard bolts, shoulder bolts, or headed pins are used for spokes 12a. This modified flange 13c is still not in its finished condition.

In the third stage the spokes 12a are installed into the counter-bored holes in flange 13c and received by the receptacles 115 in nose 11a. The hub 1a' is now in one piece.

In the fourth stage the hub 1a' is machined on its radially distal periphery to obtain the desired geometry for receiving elastomer 2. Hub 1a' thus transforms into its finished condition 1a.

Lastly, elastomer 2 is press-fitted in between hub 1a and ring 3 thereby completing the assembly of the TVD.

Figure 4:
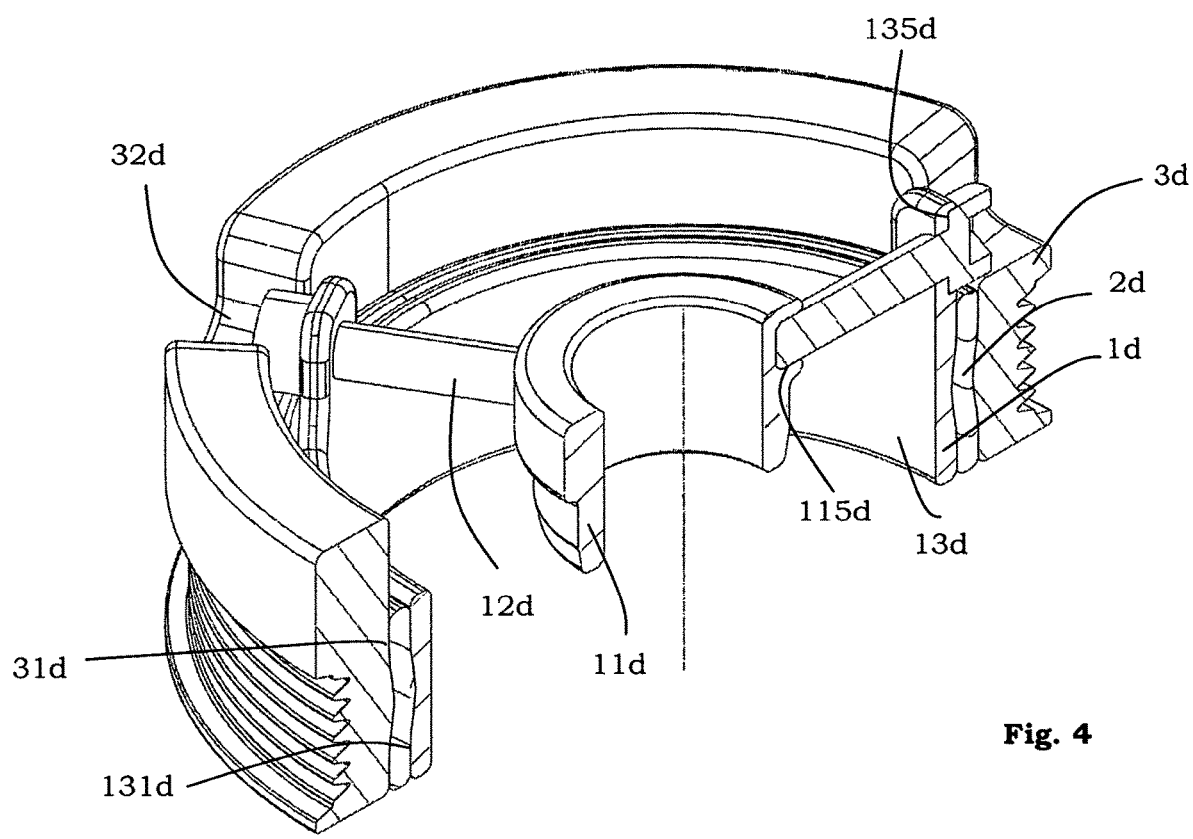
FIG. 4 is a partial cross-section illustrating another embodiment of the invention where the ring is positioned radially outward from the hub and the spokes do not interfere with the surfaces that receive the elastomer.

FIG. 4 illustrates another embodiment of the invention where elastomer 2d and ring 3d are positioned radially outward from hub 1d. However, the spokes 12d do not interfere with surface 132d of hub 1d and with surface 31d of ring 3d; therefore, the requirement to machine surface 132d after assembly of the spokes 12d is essentially eliminated.

The construction of the nose 11d remains unaltered from the embodiment illustrated in FIG. 2. Flange 13d may now have a plurality of tab like axial extensions that contain the CB/CS holes 135d, or just an extended axis-symmetric region without tabs that contains the CB/CS holes 135d. Correspondingly, ring 3d may have a plurality of openings through which the heads of the spokes 12d extend. This construction essentially creates an angular hard stop for preventing the slip of the elastomer along surfaces 31d and 132d under high torsional loading such as a Front End Accessory Drive (FEAD) lock. Furthermore, this construction also creates an axial hard stop for preventing the slip of the elastomer along surfaces 31d and 132d under high axial loading such as a vehicle collision.

Figure 5:
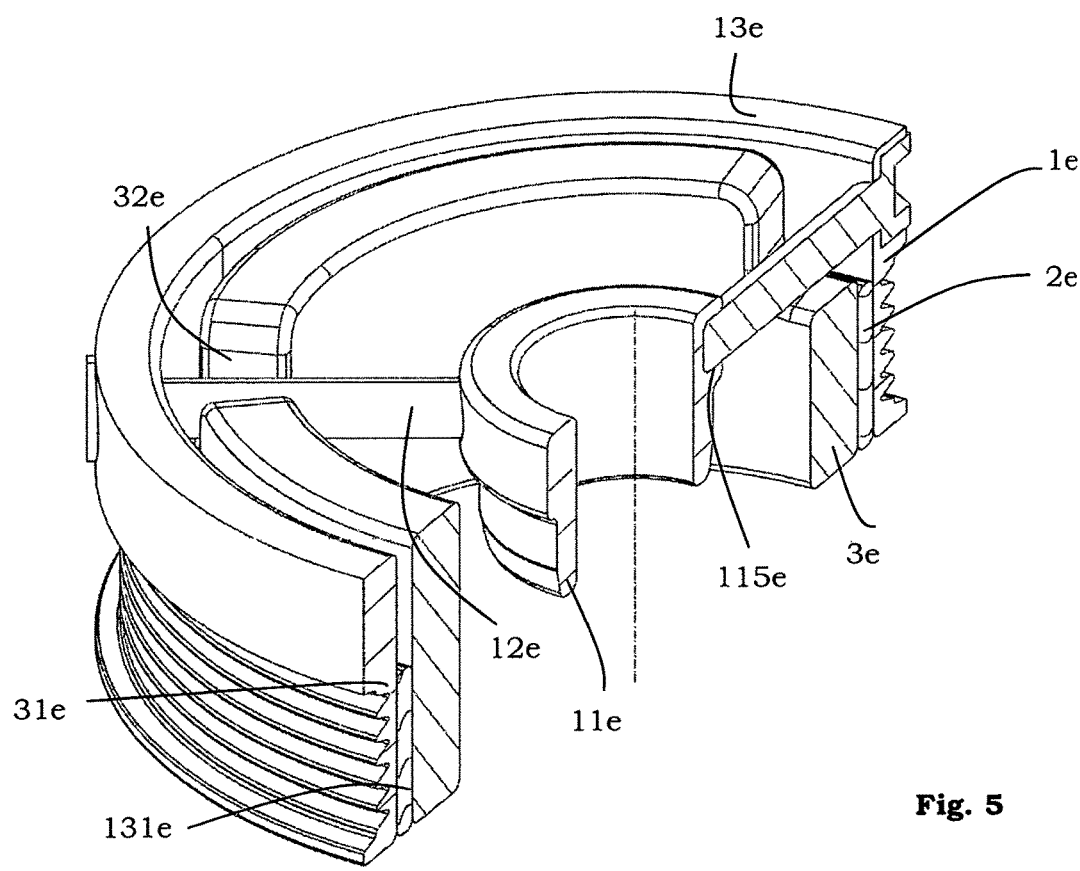
FIG. 5 is a partial cross-section illustrating another embodiment of the invention where the ring is positioned radially inward from the hub and the spokes do not interfere with the surfaces that receive the elastomer.

FIG. 5 illustrates another embodiment of the invention where elastomer 2e and ring 3e are positioned radially inward to hub 1e. Such a construction is otherwise known as an "Internal Mass TVD," or alternatively as a "Direct-Drive TVD" and is the preferred construction of Belt Start Generation (BSG) systems used in engine start-stop applications. Such vehicles require that the torque path from the FEAD to the crankshaft be directly through hub 1e, and not through the elastomer 2e which could potentially slip along surfaces 132e or 31e. However, the spokes 12e do not interfere with surface 132e of hub 1e and with surface 31e of ring 3e; therefore, the requirement to machine surface 132e after assembly of the spokes 12e is essentially eliminated.

The construction of the nose 11e remains unaltered from the embodiment illustrated in FIG. 2. Flange 13e may now have a plurality of tab like axial extensions that contain the CB/CS holes 135e, or just an extended axis-symmetric region without tabs that contains the CB/CS holes 135e. Correspondingly, ring 3e may have a plurality of openings through which the heads of the spokes 12e extend. This construction essentially creates an angular hard stop for preventing the slip of the elastomer along surfaces 31e and 132e under high torsional loading such as a FEAR lock. Furthermore, this construction also creates an axial hard stop for preventing the slip of the elastomer along surfaces 31e and 132e under high axial loading such as a vehicle collision.

Figure 6:
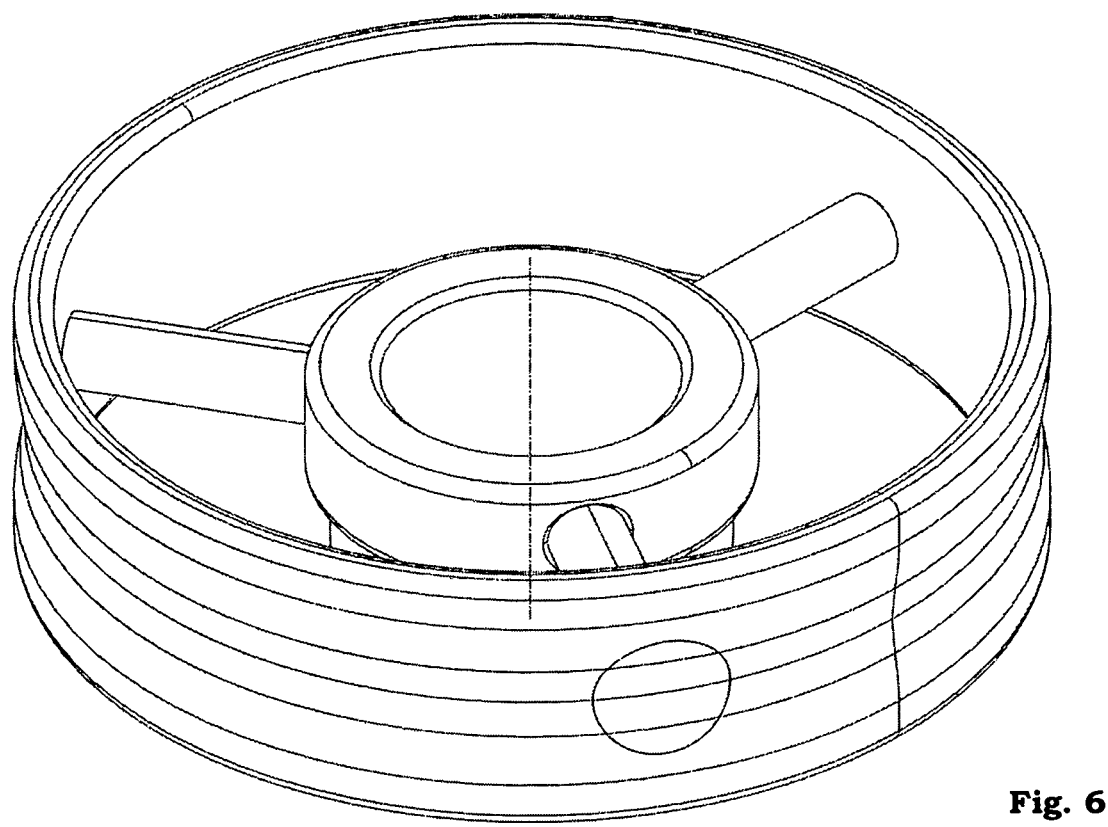
FIG. 6 is another embodiment of the invention where the heads of the fasteners are machined off to match the outermost axis-symmetric surface of the flange of the hub.

FIG. 6 is another embodiment of the invention where the heads of the fasteners are machined off to match the outermost axis-symmetric surface of the flange of the hub.

The invention claimed is:

1. A Torsional Vibration Damper (TVD) comprising of:
   a hub, further comprising of:
      a nose further comprising of:
         a first annular surface oriented perpendicular to the central axis of the hub;
         a second annular surface opposing the first annular surface;
         bounded by a first axis-symmetric surface radially proximate to the central axis of the hub; and
         a second axis-symmetric surface radially distal to the central axis of the hub, further comprising of:
            a plurality of radially oriented blind holes;
      a flange further comprising of:
         a first annular surface oriented perpendicular to the central axis of the hub;
         a second annular surface opposing the first annular surface;
         bounded by a first axis-symmetric surface radially proximate to the central axis of the hub; and
         a second axis-symmetric surface radially distal to the central axis of the hub further comprising of:
            a plurality of radially oriented counter-bored or counter-sunk openings;
      a plurality of radially oriented solid monolithic fasteners each further comprising of:
         a cylindrical or conical head received by one of the counter-bored or counter-sunk openings in the flange respectively;
         and a cylindrical body attached to the cylindrical or conical head on one axial periphery and received by one of the blind holes in the nose on the opposing axial periphery; and
   an inertia member concentric about the hub with an elastomeric member operatively positioned therebetween.

2. A TVD comprising of the hub defined in claim 1 wherein after the assembly of the nose, flange, and fasteners, the plurality of the heads of the fasteners are partially machined to match the second axis-symmetric surface of the flange.

3. A TVD comprising of the hub defined in claim 1 where the fasteners are threaded bolts and the blind holes in the nose are threaded.

4. A TVD comprising of the hub defined in claim 1 where the fasteners are shoulder bolts and the blind holes in the nose are threaded.

5. A TVD comprising of the hub defined in claim 1 where the fasteners are headed pins.

* * * * *